US012624579B2

(12) United States Patent
Inan et al.

(10) Patent No.: US 12,624,579 B2
(45) Date of Patent: May 12, 2026

(54) MOTOR VEHICLE WITH A LOCKING SYSTEM

(71) Applicant: KIEKERT AKTIENGESELLSCHAFT, Heiligenhaus (DE)

(72) Inventors: Ömer Inan, Dorsten (DE); Michael Scholz, Essen (DE); Holger Schiffer, Meerbusch (DE); Uwe Reddmann, Essen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 65 days.

(21) Appl. No.: 18/712,392

(22) PCT Filed: Nov. 18, 2022

(86) PCT No.: PCT/DE2022/100862

§ 371 (c)(1),
(2) Date: May 22, 2024

(87) PCT Pub. No.: WO2023/098939

PCT Pub. Date: Jun. 8, 2023

(65) Prior Publication Data

US 2025/0003261 A1 Jan. 2, 2025

(30) Foreign Application Priority Data

Dec. 3, 2021 (DE) ..................... 10 2021 131 891.2

(51) Int. Cl.
*E05B 77/12* (2014.01)
*E05B 81/90* (2014.01)

(52) U.S. Cl.
CPC .............. *E05B 77/12* (2013.01); *E05B 81/90* (2013.01)

(58) Field of Classification Search
CPC .......... E05B 77/12; E05B 77/02; E05B 81/90; E05B 81/04; E05B 81/06; E05B 81/14
See application file for complete search history.

(56) References Cited

U.S. PATENT DOCUMENTS

2015/0115625 A1* 4/2015 Park ........................ E05B 83/24 292/194
2019/0152425 A1* 5/2019 Szente .................... B60R 21/34

FOREIGN PATENT DOCUMENTS

AT 516050 B1 2/2016
DE 19545722 A1 4/1997
DE 19847079 A1 * 4/2000 ............. E05B 81/82

(Continued)

OTHER PUBLICATIONS

International Search Report mailed Mar. 15, 2023, for priority International Application No. PCT/DE2022/100862.

*Primary Examiner* — Christine M Mills
*Assistant Examiner* — Christopher F Callahan
(74) *Attorney, Agent, or Firm* — Renner, Otto, Boisselle & Sklar, LLP.

(57) ABSTRACT

A motor vehicle locking system having a locking mechanism with a rotary catch and at least one pawl, wherein the rotary catch can be latched in at least one latching position by means of the pawl in order to hold a lock striker; a control unit; and a pyrotechnic actuator, wherein the pyrotechnic actuator can be activated by means of the control unit, and the locking mechanism can be unlocked by means of the pyrotechnic actuator.

13 Claims, 2 Drawing Sheets

(56) References Cited

FOREIGN PATENT DOCUMENTS

| | | | |
|---|---|---|---|
| DE | 19961019 | C1 | 2/2001 |
| DE | 102018113562 | A1 | 12/2019 |

* cited by examiner

MOTOR VEHICLE WITH A LOCKING SYSTEM

This application is a national phase of International Patent Application No. PCT/DE2022/100862 filed Nov. 18, 2022, which claims priority to German Patent Application No. 10 2021 131 891.2 filed Dec. 3, 2021, each of which is hereby incorporated herein by reference in its entirety.

FIELD OF DISCLOSURE

The invention relates to a motor vehicle having a locking system, a locking mechanism with a rotary catch and at least one pawl, wherein the rotary catch can be latched by means of the pawl in at least one latching position in order to hold a lock striker; a crash sensor; and a pyrotechnic actuator, wherein the pyrotechnic actuator can be activated by means of the crash sensor.

BACKGROUND OF DISCLOSURE

Today's motor vehicles are increasingly being equipped with electrically assisted operating elements. With regard to a locking system, such as a vehicle door lock, it is common nowadays for the door lock to be lockable using a radio remote control. This means that the vehicle can be unlocked and/or opened using a vehicle key, for example, so that the operator can gain access to the vehicle using the door handle. One development in the automotive industry and with regard to vehicle access solutions is that there is no need for an external door handle—or at least mechanical operation of the motor vehicle lock. The complete absence of an outside door handle offers the advantage that the design of the vehicle can be created independently of a door handle. In the case of a door handle without a mechanical connection to the door lock, a door handle is actuated, but only an electrical signal is transmitted to the door lock, wherein the door lock is unlocked electromechanically so that the door can be opened. The mechanical connection between the outside door handle and the locking system is also referred to as mechanical redundancy. If a mechanical connection can be established between the outside door handle and the lock—for example, in the event of an accident—this is referred to as temporary crash redundancy (TCR).

An electrically actuatable motor vehicle lock is known from DE 10 2018 113 562 A1. The motor vehicle lock discloses an electromechanical drive which can unlock a locking mechanism with the aid of a release lever, so that a lock striker held by means of the locking mechanism can be released. By using the electromechanical drive to release or unlock the latched locking mechanism, there is no need for mechanical redundancy. The use of this vehicle lock therefore makes it possible to dispense with an external door handle or, if an external door handle is used, to open the vehicle lock simply by actuating the door handle using an electrical signal, and thus gain access to the vehicle.

In addition to the use of electrically assisted access systems in motor vehicles, safety systems are also used to protect both the driver and the other party in the event of an accident, for example. For example, passive safety systems are known which ensure that the impact energy is dissipated in a defined manner when a pedestrian hits the hood. The impact energy is absorbed by raising the hood or front cowling. Such a safety system has been disclosed, for example, in AT 516 050 B1. So-called pyrotechnic actuators are used to raise the hood in the event of a detected accident at the front of the vehicle. Pyrotechnic actuators work with propellant charges that act upon a cylinder and move a piston to raise the hood. If an accident is detected by a crash sensor, the pyrotechnic actuator is activated, allowing the hood to be raised in fractions of a second, especially milliseconds.

Another drive device for a vehicle component, such as a headrest, by means of a pyrotechnic actuator, is known from DE 199 61 019 C1, for example.

The pyrotechnic actuators are used where an accident is immediately detected by the crash sensor, so that the safety systems can be activated. The consequences of accidents can thus be reduced for the people involved.

With regard to motor vehicle locking systems, special requirements must be met in order to secure vehicle occupants in the event of an accident. In the event of an accident, unlike a hood, for example, the locking systems must keep the doors or hatches closed in order to protect the occupants of the vehicle. If a voltage drop occurs in the vehicle's power supply in the event of an accident, an electrically operated locking system, especially a locking system without mechanical redundancy, cannot be opened without difficulty. Measures must therefore be taken to enable the emergency opening of a vehicle lock. This is where the invention starts.

SUMMARY OF DISCLOSURE

The object of the invention is to provide a locking system for a motor vehicle which, while dispensing with mechanical redundancy, on the one hand makes it possible to secure the vehicle in the event of an accident, and on the other provides emergency actuation of the vehicle lock.

The object of the invention is achieved by the features of independent claim 1. Advantageous embodiments are provided in the subclaims; however, it is hereby noted that the invention is not limited to the subject matter of claim 1. Rather, the subject matter of the invention can be combined in any way by the features of the claims, the description, and also the exemplary embodiments.

The object of the invention is achieved by the provision of a motor vehicle with a locking system, in particular a door lock, having a locking mechanism with a rotary catch and at least one pawl, wherein the rotary catch can be latched by means of the pawl in at least one latching position in order to hold a lock striker; a control unit; and a pyrotechnic actuator, wherein the pyrotechnic actuator can be activated by means of the control unit, and wherein the locking mechanism can be unlocked by means of the pyrotechnic actuator. The structure of the motor vehicle or the motor vehicle locking system according to the invention makes it possible, on the one hand, to provide a safety system in the form of a locking system which, if mechanical redundancy is dispensed with, both makes it possible for the occupants to be secured in the event of an accident, and also enables the locking mechanism to be opened or unlocked. If a voltage drop is detected in the vehicle as a result of an accident, the pyrotechnic actuator can be used to move the locked locking mechanism into an unlocked position. In particular, it is possible for the control unit to select the time of activation of the pyrotechnic actuator in such a way that, on the one hand, the occupants are protected immediately at the time of the accident, but the locking system can then be unlocked by the pyrotechnic actuator. As a result, the occupants can get out of the vehicle, without the need for mechanical redundancy between an outside door handle and/or an inside door handle.

Locking systems, in particular door locking systems, are employed where components arranged movably on the motor vehicle have to be securely held in their position during use of the motor vehicle. The locking systems are therefore used for doors, sliding doors, hatches, covers, and/or hoods. In each case, the locking systems comprise a locking mechanism with a rotary catch and at least one pawl, wherein a lock striker can be gripped and held by means of the locking mechanism. Preferably, but not restrictively, the locking system is installed in the movable component, e.g., the side door, and works together with a hood lock attached to the body in the form of a bracket or bolt. When the movable component is closed, the locking mechanism at least reaches a main latching position; however, a pre-latching position is prescribed for side doors. The lock striker is held in the latching position by means of the locking mechanism. To unlock the locking mechanism, a release lever is used to disengage the pawl from the rotary catch so that the locking mechanism is unlocked, and the movable component can be opened or moved. A control unit is assigned to the locking system; today's motor vehicles contain a large number of control units by means of which a control signal can be passed on to the pyrotechnic actuator. If an accident is detected, wherein so-called crash sensors are used, a control signal is relayed to the pyrotechnic actuator by means of the control unit after a prespecifiable time interval, so that the locked locking mechanism can be unlocked, and the pawl is released from engagement with the rotary catch. If there is no mechanical redundancy, this provides a way of unlocking the locking system and allowing the operator to open the movable component or door. This means that a vehicle can be opened safely without mechanical redundancy, even in the event of an accident.

If the pawl can be actuated directly or indirectly by means of the actuator, this results in a variant embodiment of the invention. The actuator can move the pawl in such a way that the pawl is disengaged from the rotary catch, and thus unlocking of the locking mechanism can be initiated by means of the actuator. Depending upon the arrangement of the actuator in or on the locking system, the actuator can be directly or indirectly connected to the pawl. Preferably, a pivoting or rotating movement is applied to the pawl so that the pawl is pivoted out of the range of movement of the rotary catch. If a retaining element, in particular a retaining lever, is provided, wherein the lock striker can be retained by means of the retaining element, a further embodiment variant of the invention is achieved. A retaining lever for the lock striker is advantageous in this respect because unlocking the locking mechanism releases the lock striker, and the movable component is therefore able to move freely. If a retaining element is used, the retaining element provides a means of preventing the lock striker from fully releasing the movable component. The retaining element thus provides a safety system for the locking system. It can be advantageous if the pawl and the retaining lever can be actuated together by means of the pyrotechnic actuator. If the pyrotechnic actuator is actuated by the control unit during initialization, the pawl is moved out of engagement with the rotary catch, and at the same time the retaining element is displaced, pivoted, or moved in such a way that the retaining element enters the movement range, i.e., an inlet mouth of the locking system, and thus prevents the lock striker from moving out of the locking system. The combined movement of the retaining lever and the pawl allows the locking mechanism to be unlocked or opened safely without any uncontrolled movement of the movable component. The actuator is driven explosively by a propellant charge and performs a linear movement. Preferably, the pawl on the one hand and the retaining lever on the other can be moved linearly, but pivoting movements are preferably introduced into the pawl and the retaining lever.

If an opening lever is provided in the locking system, wherein an actuating force can be introduced into the lock striker by means of the opening lever, the safety system can have a further advantageous embodiment. An opening lever can be used to move the lock striker out of engagement with the rotary catch. The lock striker is thus subjected to a force that pushes the lock striker from the latching position into an open position. In a main latching position of the locking mechanism, i.e., in a closed position of the side door, for example, the door element rests against the door seal under pre-load. The door seal pressure is absorbed by the interaction of the locking system and lock striker. The rotary catch is thus held in the main latching position under a pre-load. If the pawl is then released from engagement with the rotary catch by means of the actuator, the door seal pressure and the resulting force support the opening movement of the rotary catch.

In addition, a rotary catch spring can be provided, which also applies a spring force to the rotary catch in the opening direction. However, the pyrotechnically activated locking system according to the invention is used when there is a power failure in the vehicle. This can happen, for example, if there is a power cut as a result of an accident. In this case, a delay in the vehicle may also mean that there is no longer sufficient force available to open or raise the movable component. The lock striker can then be moved into the open position using the opening lever. For this purpose, the opening lever can preferably be operated by means of the actuator. If the opening lever is actuated in addition to the retaining lever and/or the pawl, a combined movement of opening, securing, and deployment occurs during the movement of the actuator. In an advantageous manner, the actuation takes place in such a way that the pawl and the retaining lever are actuated together and on a first section of the movement of the actuator, so that the rotary catch comes free, and at the same time the retaining safety moves into the restraint position. By moving the actuator further over a second section, the opening lever is then moved, and the lock striker is forced into the open position. This ensures that the lock striker moves into the release position even if the rotary catch is jammed—for example, due to an accident. It may be that either the door seal pressure is insufficient to raise the movable component or, as already described above, the locking system may be distorted, so that the rotary catch cannot rotate freely. In this case, the movement of the actuator over the second section forcibly disengages the lock striker from the rotary catch.

In an advantageous way and to achieve a compact design of the locking system, the retaining lever can be mounted on an axis of rotation of the rotary catch. The simultaneous mounting of the retaining lever on the pivot axis of the rotary catch enables a compact design of the locking system, since no separate bearing point needs to be provided, and the mounting of the retaining lever on the rotary catch also makes it possible to move the retaining lever quickly and easily into the movement range of the lock striker. The lock striker usually enters the locking system via an inlet area and is held in a fork opening of the rotary catch. The rotary catch swivels around the bearing position while the lock striker is being received. The rotary catch also swivels when the locking mechanism is opened and releases the lock striker again. In this case, the retaining lever can be used to secure the inlet area of the lock and hold the movable component in an open position.

It can also be advantageous if the opening lever can be mounted on an axis of rotation of the pawl. The bearing of the opening lever on the existing pivot axis of the pawl makes it possible to achieve a cost-effective design of the locking system and at the same time to realize favorable engagement conditions between the lock striker and the opening lever.

An alternative embodiment of the invention is achieved if the actuator can be activated by manual operation. In the event of an accident, the actuator can be activated by means of the control unit, wherein ignition of the propellant charge in the actuator moves the actuator or an actuating means arranged on the actuator—for example, in the form of a slider. However, the control command from the control unit can also be used to activate an emergency actuation mode. In this alternative embodiment, activation of the actuator does not lead directly to ignition of the propellant charge, but an emergency actuation mode is enabled, which can be operated manually by an operator. Depending upon the design of the locking system and/or the requirements placed upon the locking system, different designs of the locking system can be realized. If there is a power failure in the case of an accident, it is therefore possible to move the actuator immediately by pyrotechnic means, or an emergency actuation mode is enabled, which initiates activation of the pyrotechnic element in the actuator. It is conceivable, for example, that, in the event of an accident, the movable component remain closed, and the pyrotechnic actuator only be ignited when the outside door handle is operated, causing the movable component to be moved into the open position. This ensures safety in the event of an accident and also guarantees that the vehicle occupant can get out of the vehicle even if there is no mechanical redundancy between the door handle and the locking system. For manual operation of the actuator, for example, an emergency actuation button can be used, which can be activated as described above, e.g., by means of the door handle, or can be arranged in an area exposed in the open position of the movable component. The emergency actuation button can be a real pushbutton, but it is also conceivable that the ignition unit be able to be activated by means of a mechanical actuation—for example, a spring-loaded lever arrangement. In any case, however, the pyrotechnic actuator is first activated by the control unit, so that the ignition of the propellant charge can be initiated by manual intervention. In the event of a complete power failure, one embodiment of the invention may also be that the ignition charge can be triggered by means of a piezoelectric effect, for example. For example, a pushbutton or a lever can interact with a piezoelectric element to provide the necessary ignition energy for the propellant charge in the actuator.

In a further embodiment variant, an emergency actuation handle can be released after activation of the pyrotechnic actuator, wherein the retaining lever can be moved out of engagement with the lock striker by means of the emergency actuation handle. In this design variant, the lock is unlocked by means of the pyrotechnic actuator, and the movable component is opened and held in the open position by means of the retaining lever. In addition, an emergency actuation handle is provided for an operator, which can be swung out of a door gap, for example, or alternatively is made available to the operator through a predetermined breaking point in the movable component. The emergency actuation handle can then be used to move the retaining element and thus fully open the movable component—for example, a side door. The emergency actuation handle is then also transferred to an actuation position by means of the locking system, wherein the actuator, the reset lever, the opening lever, and/or a lever connected separately to the actuator can be used to provide the emergency actuation handle. The operator is then able to fully open the door manually by operating the emergency actuation handle. The design of the locking system associated with the motor vehicle according to the invention now makes it possible to open an electrically operated locking system or motor vehicle lock even in the event of an accident, and to provide emergency actuation for the operator.

BRIEF DESCRIPTION OF DRAWINGS

The invention is explained in more detail below with reference to the accompanying drawings on the basis of a preferred embodiment. However, the principle applies that the exemplary embodiment does not limit the invention, but merely represents one embodiment. The features depicted can be implemented individually or in combination with further features of the description as well as what is claimed—individually or in combination.

In the figures.

DETAILED DESCRIPTION

Figure 1:
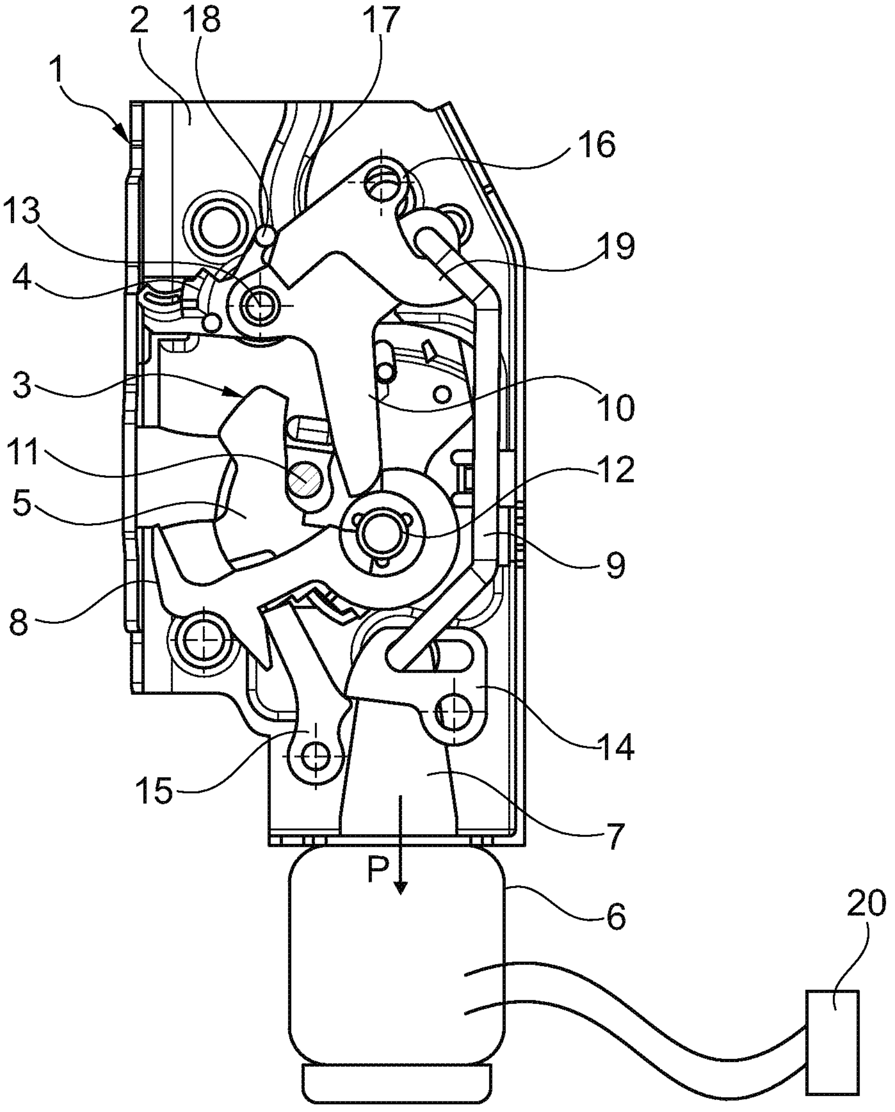
FIG. 1 shows the principle of a locking system with a pyroactuator arranged on the locking system, in a side view of the locking system, wherein only the components necessary to explain the invention are shown.

FIG. 1 shows a locking system 1 with a lock case 2, associated with the locking system 1, and a locking mechanism 3 in a main latching position. Shown are the pawl 4, the rotary catch 5, the actuating means 7 associated with the pyroactuator 6, the reset lever 8, an actuating linkage 9, an opening lever 10, and the lock striker 11 engaged with the rotary catch 5. Pawl 4, opening lever 10, rotary catch 5, and reset lever 8 are each mounted together on an axis 12, 13 in the lock case 2 so that they can be rotated and/or pivoted. The actuating linkage 9 is connected on one side to the actuating means 7 and on the opposite side to the opening lever 10 so as to rotate. In addition, further actuating means 14, 15, 16 are associated with the exemplary structure of the locking system 1 according to the invention. By means of a first actuating means 14, in the form of an actuating lever, a positioning lever 15 can move the reset lever 18. A further unlocking lever 16 is engaged with an extension 18 on the pawl via a first lever arm 17. A second lever arm 19 embraces the actuating linkage 9 to such an extent that a pivoting movement can be initiated in the unlocking lever 16 when the actuating linkage 9 is moved. By means of the actuating means 14, the positioning lever 15 can be pivoted counterclockwise, so that the retaining lever 8 can be pivoted clockwise and moved into a holding position. A propellant charge in the pyroactuator 6 can be activated by means of an ignition means 20, so that the actuating means 7 can be adjusted in the direction of the arrow P.

FIG. 1 shows the locking system 1 in a main latching position, i.e., a vehicle side door assigned to the locking system 1 is in the fully closed position, by way of example. If there is now a power loss in the case of an accident, the locking system 1 can no longer be unlocked electromechanically via a release lever, which is not shown. In this case, the pyrotechnic actuator 6 can be used to open and raise the door element in an emergency. In the main latching position, the lock striker 11 is in engagement with the rotary catch 5, wherein the rotary catch 5 is held in the main latching position by means of the pawl 4.

Figure 2:
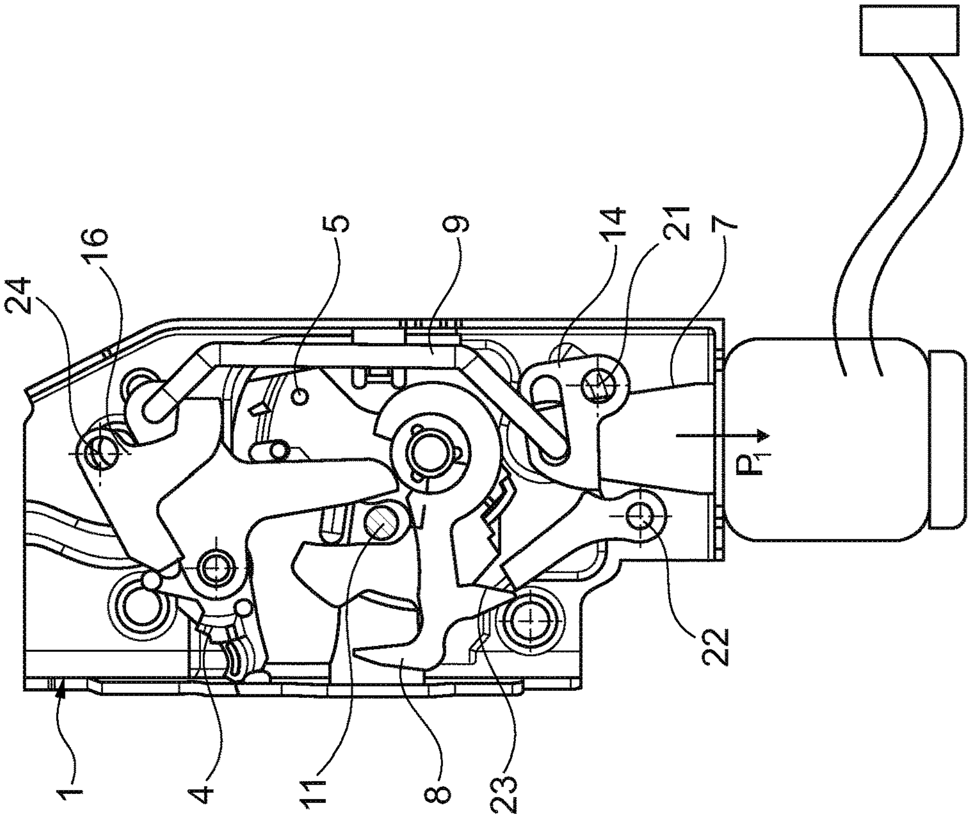
FIG. 2 shows the locking system in a first position after the pyroactuator has moved the pawl and transferred the retaining lever to the holding position.

FIG. 2 now shows the locking system 1 in a position in which the pyrotechnic actuator 6 has been activated and ignited, so that the actuating means 7 has been moved in the direction of arrow P1 over a partial range. Moving the positioning element 7 in the direction of arrow P1 causes the actuating means 14 to be pivoted counterclockwise about a pivot axis 21, wherein the positioning lever 15 is pivoted counterclockwise about the axis 22 and, in engagement with the retaining lever 8, moves the retaining lever 8 along a control contour 23 into the holding position. In addition, the unlocking lever 16 has been pivoted clockwise around the axis 24 via the actuating linkage 9, so that the pawl 4 has been released from engagement with the rotary catch 5. The rotary catch 5 now releases the lock striker 11. If the rotary catch 5 cannot move the lock striker 11 out of the main latching position independently, e.g., due to tension in the body and/or the door itself, the door element is forced open by the further movement of the actuating means 7.

Figure 3:
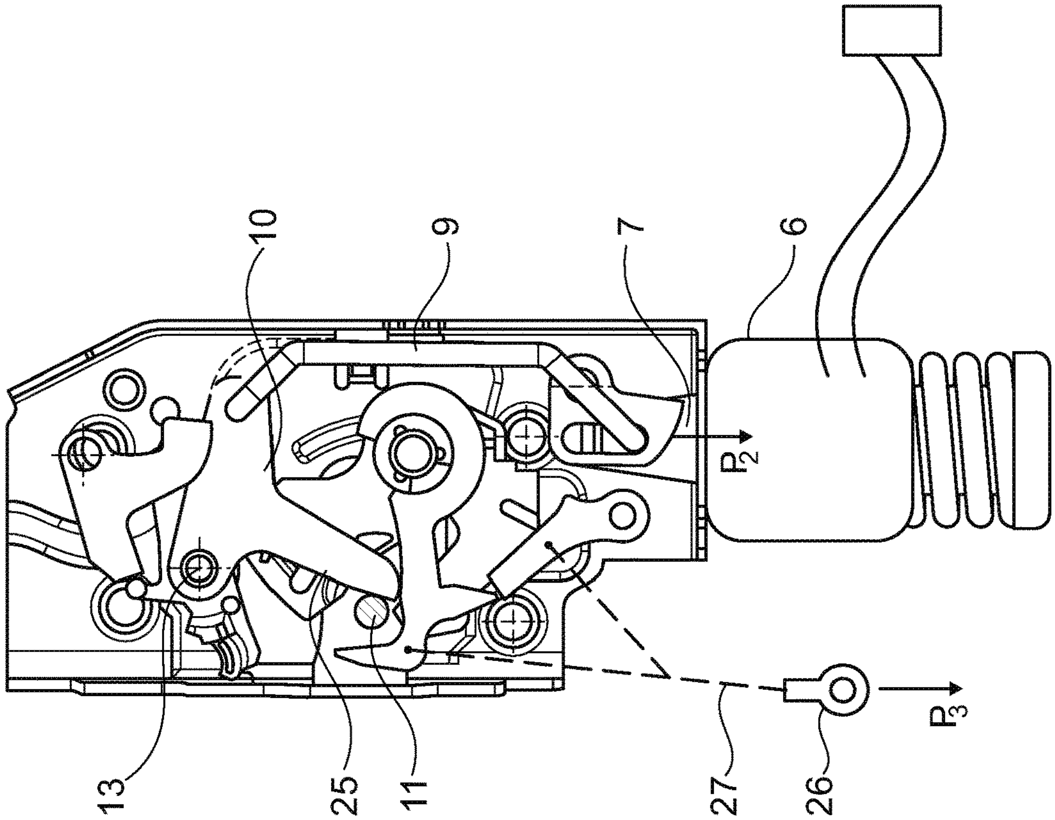
FIG. 3 shows the locking system in a position after the pyroactuator has been moved further, and the lock striker has been moved into the open position by means of the opening lever.

FIG. 3 shows the position in which the actuating means 7 has been moved completely over a second partial path in the direction of arrow P2. By adjusting the actuating means 7, the actuating linkage 9 in FIG. 3 has been moved in the direction of the pyroactuator 6, such that the opening lever 10 is pivoted about the axis 13 and an opening arm 25 moves the lock striker 11 into its open position. The lock striker 11 is thus forcibly transferred to the open position, so that a safety system for opening a locking system 1 can also be opened in the event of an accident. The locking system 1 is now in an open position in which the exemplary door element has already been opened by a few millimeters or centimeters. The lock striker 11 is held in place by the retaining lever 8 and the opening lever 10, so that the door element cannot open on its own. In this case, the retaining element can, for example, be moved out of the retaining position by manually actuating an emergency actuation handle 26, wherein the emergency actuation handle 26 is moved out in the direction of arrow P3 by, for example, manual pulling. The dashed lines 27 show examples of actuations on the positioning lever and retaining lever 8. The emergency actuation handle 26 can also be moved into an engagement position by the actuating means 7 so that the operator can see and actuate the emergency actuation handle 26.

After operating the emergency actuation handle 26, the lock striker 11 is released so that the door element can be opened completely.

LIST OF REFERENCE SIGNS

1 Locking system
2 Lock case
3 Locking mechanism
4 Pawl
5 Rotary catch
6 Pyrotechnic actuator
7 Actuating means
8 Retaining lever
9 Actuating linkage
10 Opening lever
11 Lock striker
12, 13, 21, 22, 24 Axis
14, 15, 16 Actuating means
15 Positioning lever
16 Unlocking lever
17 First lever arm
18 Extension
19 Second lever arm
20 Ignition agent
25 Opening arm
26 Emergency actuation handle
27 Dashed line
P, P1, P2, P3 Arrow

The invention claimed is:

1. A motor vehicle locking system comprising:

a locking mechanism with a rotary catch and at least one pawl, wherein the rotary catch is latched by the pawl at least in one latching position in order to hold a lock striker;

a control unit; and a pyrotechnic actuator, wherein the pyrotechnic actuator is activated by the control unit, and wherein the locking mechanism is unlocked by activating the pyrotechnic actuator, a retaining lever, wherein the lock striker is retained by the retaining lever, and an emergency actuation handle, wherein after activation of the pyrotechnic actuator, the emergency actuation handle is released, and wherein the retaining lever is moved out of engagement with the lock striker by the emergency actuation handle.

2. The motor vehicle locking system according to claim 1, wherein the pyrotechnic actuator acts indirectly on the pawl via an actuating lever chain to disengage the pawl from the rotary catch.

3. The motor vehicle locking system according to claim 1, wherein the pawl and the retaining lever are actuated jointly by activating the pyrotechnic actuator.

4. The motor vehicle locking system according to claim 1, further comprising an opening lever, wherein an actuating force is directed into the lock striker by the opening lever.

5. The motor vehicle locking system according to claim 4, wherein the opening lever is actuated by activating the pyrotechnic actuator.

6. The motor vehicle locking system according to claim 4, wherein the opening lever is mounted on an axis of rotation of the pawl.

7. The motor vehicle locking system according to claim 1, wherein the retaining lever is mounted on an axis of rotation of the rotary catch.

8. The motor vehicle locking system according to claim 1, wherein the pyrotechnic actuator acts directly on the pawl to disengage the pawl from the rotary catch.

9. The motor vehicle locking system according to claim 1, further comprising a crash sensor, wherein the control unit is configured to activate the pyrotechnic actuator in response to a signal received from the crash sensor.

10. The motor vehicle locking system according to claim 9, wherein the control unit is configured to activate the pyrotechnic actuator after a predetermined time interval from receiving the signal from the crash sensor.

11. The motor vehicle locking system according to claim 1, wherein the pyrotechnic actuator includes a propellant charge that drives movement of the pyrotechnic actuator.

12. The motor vehicle locking system according to claim 1, wherein the pyrotechnic actuator is manually actuatable by operation of a door handle.

13. The motor vehicle locking system according to claim 1, wherein the pyrotechnic actuator is manually actuatable.

* * * * *